United States Patent
Juopperi (12)

(10) Patent No.: US 6,225,888 B1
(45) Date of Patent: May 1, 2001

(54) AUTHENTICATION BETWEEN COMMUNICATING PARTIES IN A TELECOMMUNICATIONS NETWORK

(75) Inventor: Jari Juopperi, Kirkkonummi (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/327,609

(22) Filed: Jun. 8, 1999

Related U.S. Application Data

(63) Continuation of application No. PCT/FI97/00765, filed on Dec. 8, 1997.

(51) Int. Cl.[7] ................................................. G07D 7/00
(52) U.S. Cl. .......................... 340/5.8; 380/30; 379/219; 379/272
(58) Field of Search .................. 300/825.34; 380/21, 380/25, 30, 9; 379/272, 219; 340/5.8

(56) References Cited

U.S. PATENT DOCUMENTS

| | | |
|---|---|---|
| 5,345,506 | 9/1994 | Tsubakiyama et al. . |
| 5,572,193 | 11/1996 | Flanders et al. . |
| 5,671,285 | * 9/1997 | Newman ............................... 380/30 |

FOREIGN PATENT DOCUMENTS

| | | |
|---|---|---|
| 0 477 380 | * 9/1991 | (EP) . |
| 0615333 | 5/1995 | (EP) . |
| WO 9114348 | 9/1991 | (WO) . |
| WO 9613920 | 5/1996 | (WO) . |

* cited by examiner

Primary Examiner—Brian Zimmerman
Assistant Examiner—Yves Dalencourt
(74) Attorney, Agent, or Firm—Altera Law Group, LLC

(57) ABSTRACT

In known telecommunications systems using multiple access the terminal equipment assumes that the network element is genuine while the network element assumes that the terminal equipment is genuine. This allows false terminal equipment, a false network element or a third party to penetrate the system. The proposed commitment protocol applies bit block commitment known from cryptography and a shared encryption key and the authentication is divided into two parts, whereby one part of it is done by the terminal equipment and the other part is done by the network. The terminal equipment (MS) sends to the network element (BTS) a pseudo identifier (AMSI) which it has formed, whereupon encryption keys (MKEY, BKEY) are exchanged. Only when the network element has revealed its true identity, will the terminal equipment send the required information (IMSI, $RND_1$, $RND_2$) encrypted with a combination of the keys. Finally, the network element authenticates the terminal equipment by using the identity information which it has revealed. Only then can operation commence.

6 Claims, 3 Drawing Sheets

AUTHENTICATION BETWEEN COMMUNICATING PARTIES IN A TELECOMMUNICATIONS NETWORK

This application is a continuation of international application number PCT/FI97/00765, filed Dec. 8, 1997, pending.

FIELD OF THE INVENTION

This invention concerns origination of data transmission in a multiple access network, wherein the terminal equipment requests a channel for itself from the network using a common access channel intended for all terminal equipment and wherein in response to the request the network on a common access grant channel intended for all terminal equipment makes known that channel to the terminal equipment on which information transmission proper will take place.

BACKGROUND OF THE INVENTION

It is a general principle in telecommunications networks using multiple access that for using services of the network the terminal equipment by using some uplink access method must first inform the network of its desire to gain access to the network. This takes place so that e.g. a special channel is reserved in the network as a common channel for all terminal equipment, which send a request on this channel to obtain a service. Depending on the network, this request may contain just a request to have a channel for two-way data transmission or it may contain information on which particular service is desired and possibly also information on the desired channel capacity. The channel may be a stream type or packet channel. The layer relaying requests is called the Medium Access Control Sublayer (MAC layer) according to the OSI model and it uses services of the physical layer to produce services for the control layer of the logical link.

In time-division cellular multiple access networks a channel is assigned on which all mobile stations when forming mobile originated calls send a request for a traffic channel from the network. The request, which is relayed over the radio path to the base station and from this along a cable to the base station controller, contains the mobile station's identifier IMSI, so that the base station controller will know from whom the request has come. In a GSM system such a channel used by all is called Random Access Channel (RACH). Should collisions between requests occur on the channel, the mobile station will try again after a moment until the request is received. The network sends to the mobile stations acknowledgements of the requests on a channel to which all mobile stations are listening. In a GSM system this channel is called Access Grant Channel (AGCH): the acknowledgement contains the mobile station's identifier, from which the mobile station will know that the message is intended for itself, and the number of the channel allocated by the network as a traffic channel.

Access in accordance with the MAC protocol is also used in interactive cable TV systems, where a desired audiovisual service can be transferred to several recipients through a fixed network. The physical transfer path may be a coaxial cable and/or an optical cable or a radio network or the distribution may take place through a satellite. In the system the name Head End is given to a central place where an incoming dispatch is divided over several physical signal paths, such as several optical fibers, by which the dispatch is taken closer to the consumers. In the systems, transmission may take place both in downlink and uplink directions in time slots which are numbered starting from zero and ending with some max number, after which numbering starts again. The time slots 0, ..., max form a frame. For terminals to be able to send information upwards, such a channel may be used in the uplink direction where the access form is Aloha, whereby all subscribers may send requests in any time slot. The network acknowledges a successful transmission by echo checking on a downlink channel. In the uplink direction, only a certain time slot may alternatively be used for sending requests. This is a slotted Aloha access type. It is essential also in these systems for the terminal to include its identifiers in its access message, so that the Head End may know who sent the request.

It is characteristic according to FIG. 1 for systems of the described type that when several terminal equipment A wish to communicate with network B, they request a private channel on a common channel U. The request message contains requester A's identifier. The network element may perform authentication of the requester, and if the matter is OK, it will allocate a private channel T for the requestor and will send information about the channel either on the same common channel U or on another common return path channel D. The information contains requester A's identifier. A receives the message and begins communicating on the allocated channel T.

FIG. 2 shows exchange of messages used in network access in a known GSM mobile telephone system. When a mobile station wishes to form a call, it sends on a one-way (uplink direction) Random Access Channel (RACH) to the base station a Channel Request to have a Traffic Channel (TCH) at its disposal, step 211. The request contains a 5-bit random number, which first functions as the mobile station's identifier. The base station receives, step 213, and relays the request to the base station controller, which selects a free channel, activates it on the base station, step 212, and then forms an Immediate Assignment, which the base station sends on a Paging and Access Grant Channel (PAGCH) to the mobile station, step 214. The assignment contains a description of the allocated channel, a preset timing value, the transmission power value to be used and the same 5-bit random number which was sent by the mobile station, and also the time slot number with which the base station had received the channel request. With this information the mobile station is able to distinguish the message intended for itself and will learn the allocated traffic channel, step 215.

The mobile station then signals to the base station on the traffic channel the link layer initial message containing the SABM frame. In this message the mobile station states its identity IMSI (International Mobile Subscriber Identity) or its Temporary Mobile Subscriber Identity (TMSI), step 224. The base station receives the message, step 226, and acknowledges it with a response message, the UA frame of which contains the identity of the mobile station, step 228. The mobile station compares its own identity with the received identity, step 223, and if the identities are similar, it will know that the traffic channel is reserved for itself.

Before starting operation, authentication is also performed on the principle that the network puts a question to the mobile station to which only the right mobile station will know the answer. Authentication is based on an authentication algorithm A3 and on a subscriber-specific authentication key $K_i$. In the early part of authentication the authentication center AuC sends a question to the mobile station which is a random number RAND. The mobile station receives the RAND, transfers it to the SIM card, which performs the A3 algorithm with its aid and with the aid of the subscriber-specific key $K_i$ in the card. The Signed Result (SRES) is sent by the mobile station to the network. Authentication center AuC compares the SRES value with the value which it has computed itself using the same A3 algorithm, RAND and key $K_i$. If the SRESs are identical, the authentication is approved, otherwise the subscriber is denied access to the network. The mobile station uses the received RAND and $K_i$ values also for computing a connection-specific encryption key Kc. In the network, authentication center AuC performs the same algorithm with the same values, thus resulting in the same encryption key. Both store the key in memory and in addition the mobile station sends the key to authentication center AuC, which checks to make sure that both are using the same keys.

It is a noteworthy feature in the process shown in FIG. 2 that the mobile station has sent its own identity to the network before it is quite sure that the traffic channel is allocated to itself and to nobody else.

It is taken for granted in known systems of the type shown in FIG. 1 that the party A requesting access knows as a matter of course that network element B is exactly what A assumes it to be and that network element B will not doubt that the terminal equipment using the received symbol is terminal equipment A.

It is a problem in these systems that the network always performs the authentication. It is hereby possible for a third party to come between the identifying party and the one to be identified, to eavesdrop on the first messages and to put himself in the other party's place. This is possible especially if a part of the transmission path between A and B is a radio path, which is the case in mobile telephone networks, but likewise in fixed networks a third party may connect to the line and eavesdrop on the traffic. It is hereby possible for the third party to capture a channel request message sent by terminal equipment A and to interpret from this the request and, above all, A's identifier. It will then in one way or another eliminate terminal equipment A and take its place. It then receives the channel allocation message sent by the network element, connects to the channel pretending to be terminal equipment A and thus gains access to the network. There is no possibility for network element B to know that it is communicating with a third party instead of the genuine terminal equipment A.

It is also possible for network element B to be the impostor. Hereby terminal equipment A when contacting network element B immediately gives it its identity data in the first message. B hereby knows who A is, but A does not know that B is only pretending to be A. Such a situation is possible e.g. in mobile station networks, whereby a "false" base station may take the place of the genuine one and thus eavesdrop on and control the radio traffic.

It is not possible with state-of-the-art systems to prevent situations as those described above. The present invention thus aims at a method by which it is possible to prevent the described situations, and such a case in particular where the terminal equipment never discloses its identity to any third party eavesdropping on the traffic between the terminal equipment and the network element and where the terminal equipment will disclose its identity only when being sure that the network element really is the one it declares itself to be, whereby when the network element is an impostor it will never know the true identity of the terminal equipment.

The method according to the invention is characterized by the features defined in the independent claims.

BRIEF SUMMARY OF THE INVENTION

The proposed method is based on the fact that the commitment protocol applies bit commitment known from cryptography and a shared encryption key and that authentication is divided into two, whereby a part of the authentication is done by the terminal equipment and the other part is done by the network. The terminal equipment first makes sure that the network element is authentic by performing authentication of the network element. In this connection the network element will disclose its own identity. Then the terminal equipment reveals its own identity to the network element by sending the necessary information on a protected channel. Finally, the network element authenticates the terminal equipment by using the identity information which it has disclosed. Only after this can traffic be started.

The terminal equipment requesting access in the commitment protocol first makes a pseudo identifier for itself, which it forms by applying a one-way hash function to its correct identifier. The hash function is not applied to the identifier as such, but the correct identifier is first encrypted. This being the case, the network or network element upon receiving the pseudo identifier can not get to know the correct identifier without the code. When the network element has stated the traffic channel to the terminal equipment, about which it knows only the pseudo identifier at this stage, the terminal equipment will generate its own security key half, that is, the first partial key, and will send it to the network. On receiving the partial key the network element will also form its own security key half, that is, the second partial key. It sends these to the terminal equipment of the pseudo identifier, so both parties will at this stage have both partial keys in their possession.

The terminal equipment checks if the pseudo identifier received from the network element and the pseudo identifier it formed earlier itself are identical, and if they are, it will perform authentication of the network element in some known manner.

After authentication, the network element has revealed itself to the terminal equipment, but the real identity of the terminal equipment is still known only to the terminal equipment. The network element will not get to know the real identity until the terminal equipment has sent information to it on how the true identity was encrypted before the use of the hash function.

The terminal equipment now send its own true identifier to the network element. For this purpose, the terminal equipment forms a message containing a) its true identifier, b) information on how the true identifier was encrypted before application of the hash function. It encrypts the message before sending it by using a key formed both of the first and of the second partial key.

The network element receives the message, decodes it using the first and second partial key and checks if the contents of the message are correct. If they are, the network element will perform authentication of the terminal equipment by some known method.

After a successfully performed commitment protocol and mutual authentication, traffic can be started on the traffic channel.

LIST OF FIGURES

The invention will be described in greater detail referring to the enclosed diagrammatic drawings, wherein FIG. 1 shows state-of-the-art message exchange;

DESCRIPTION OF THE INVENTION IN DETAIL

Figure 2:
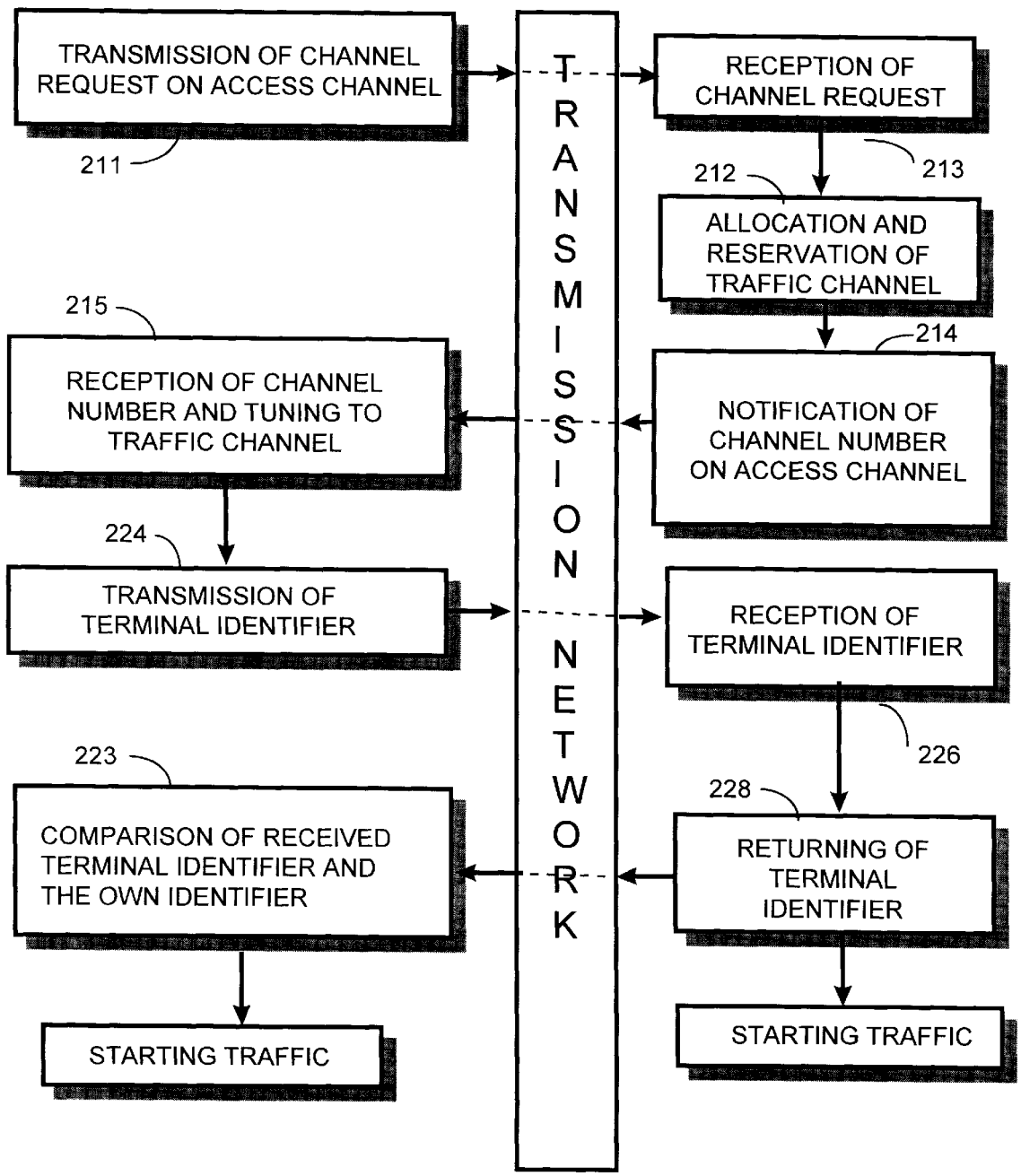
FIG. 2 shows message exchange in a mobile telephone system.
Figure 3:
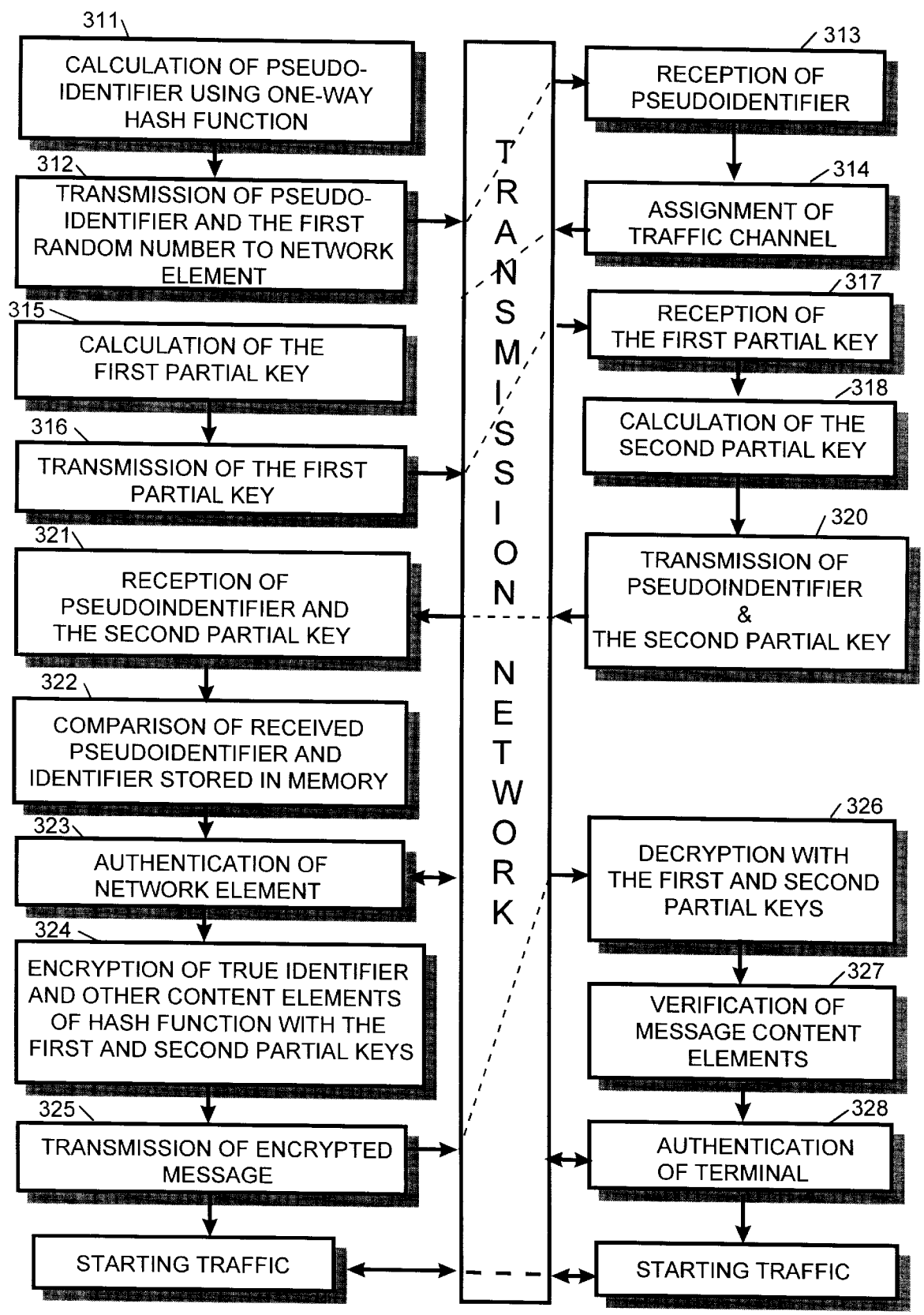
FIG. 3 shows a commitment protocol according to the invention.

FIG. 3 shows a method according to the invention as applied to a GSM cellular system. It thus contains the same elements as the basic procedure shown in FIG. 2, so the description will also refer to FIG. 2 when required.

The commitment protocol to be used in the invention requires five steps, each one of which is known from cryptography:

1. bit block commitment,
2. exchange of keys,
3. identification of the network element,
4. revealing the terminal equipment's identity to the network element, and
5. identification of the terminal equipment.

The method of bit block commitment is described in detail in a book by Bruce Schneier: "Applied Cryptography, Second Edition, Protocols, Algorithms, and Source Code in C", John Wiley & Sons; Inc, 1996, ISBN 0-471-11709-9. The method is such that 1) party A first forms random bit strings R1 and R2.
2) Then it forms a message containing these random bit strings and that bit string S (e.g. an identifier, some message or other), which it wishes to give to party B, however, so that party B will not get to know bit string S without A's permission. Random bit strings R1 and R2 as well as identifier S are simply located one after the other in the message.
3) Party A applies a one-way hash function h to the message and sends the result h(R1, R2, S) and either one of the random strings, e.g. R1, to party B. This transmission proves to B that A has really sent bit string S. The use of a one-way hash function prevents B from inverting the function, and for this reason B, although knowing the hash function and one random string R1, can not get to know bit string S, because the other random string R2 is hashed.
4) When it is time for party A to disclose bit string S, it will send the original message (R1, R2, S) to party B.
5) Party B applies a one-way hash function to this message and compares the result and random string R1 to that which party A already sent earlier in step 3. If all tally, the received string S is correct.

In this known method, party B does not send even the first message. It is a known property of the one-way hash function that from a binary string of arbitrary length it will produce a string of a fixed length, "a secure fingerprint". Hereby, when H=h(M), wherein M is a binary string of arbitrary length, h is a one-way hash function and H is a binary string of fixed length, the following will hold: a) when M is given, H may be easily calculated, b) when H is given, it is impossible to find such an M that h(M)=H would be true, c) when M is given, it is impossible to find such an M' that h(M')=h(M) would be true, and d) it is impossible to find two random strings M and M' so that h(M)=h(M') would be true.

Of known hash functions which may be used in this invention, SHA (Secure Hash Algorithm) and MD5 (Message Digest Algorithm 5) may be mentioned, but it is of course possible in principle to use any kind of other known hash function.

The purpose of the key exchange algorithm used in the commitment protocol is to form an encryption key for two or more parties even if there is no secure transfer channel between the parties. The Diffie-Hellman key exchange described in the publication referred to above and the RSA public key encryption algorithm are well suited for use in this invention.

The commitment protocol according to the invention will now be described referring to FIG. 3. Instead of sending only a random number in the channel request message on the call channel, the mobile station sends a pseudo identifier AMSI. This it forms as follows by using the one-way hash function, step 311, FIG. 3, AMSI=h(IMSI, $RND_1$, $RND_2$)

wherein h is some one-way hash function, IMSI is the mobile station's real identifier, the first random number $RND_1$ is a string of binary figures of finite length while the second random number $RND_2$ is a string of binary figures of finite length. Thus, the real identifier is coded in a sense with the first and second random numbers by simply placing the numbers and the identifier in a sequence to form a chain, and the hash function is applied to the chain. The mobile station sends its pseudo identifier AMSI and the first random number $RND_1$ through the transmission network to the network element, step 312.

It should be noted that the transmission network may be either just a radio path or a combination of radio path and cable network depending on whether the network element means a base station, a base station controller or a mobile telephone exchange. The essential nature of the network element is not essential to the invention.

The base station controller receives relayed by the base station a channel request message containing a pseudo identifier AMSI, step 313, whereupon it performs selection and activation of the traffic channel, as in the known method, that is, step 23 in FIG. 2, and in the normal manner sends a channel allocation message, wherein the allocated traffic channel is indicated, step 314.

Then some transactions are performed in the commitment protocol before the real identifier IMSI is revealed. The mobile station first makes its own security key MKEY, which is here called the first partial key, step 315. Information contained in the first partial key is used in the key exchange procedure to be carried out later. It places the partial key which it has formed in the originating message and it signals the message to the base station on the indicated traffic channel, step 316.

The network element receives the first partial key of the message, step 317. It then makes its own security key BKEY, which is here called the second partial key, step 318. Information contained in the second partial key is used in the key exchange procedure to be performed later. It then forms an acknowledgement message containing the pseudo identifier AMSI which it received earlier and the second encryption key BKEY which it has formed, and it sends an acknowledgement message to the mobile station, step 320.

The mobile station receives the acknowledgement message, step 321, and separates the elements of its contents. It examines first whether the pseudo identifier AMSI contained in the message is the same as the pseudo identifier AMSI which it created itself in step 311. If the comparison, step 322, shows that the pseudo identifiers are different, the mobile station will know that the traffic channel indicated in step 314 was not intended for itself, so it must start the access process from the beginning, from step 311. If the comparison shows that the pseudo identifiers are identical, the mobile station will know that the traffic channel indicated in step 314 is really intended for itself.

In the following step 323, the mobile station performs authentication of the network element to make sure that the network element, in this case a base station, really is what it claims to be. The authentication procedure may be any procedure, e.g. the authentication procedure nowadays used in the GSM system is suitable.

After a successful authentication the mobile station knows that it is dealing with a real base station and not with an impostor, so it is time for it to reveal its true identity. To this end it forms a message containing the real identifier IMSI (or the temporary identifier TMSI, if there is one), the first random number $RND_1$ and the second random number $RND_2$. Thus, the message is the same as the one to which it applied the hash function in step 311. Finally, it encrypts the whole message with encryption key BMKEY, which is formed of the first partial key MKEY and of the second partial key BKEY, step 324. The mobile station sends this key-encrypted message to the network, step 325.

Now then, it is time for the network element to see which is the mobile station's true identifier. First, step 326, the network element decodes the encrypted message by using security key BMKEY, which is a combination of the second partial key BKEY which it generated itself in step 318 and of the first partial key MKEY received from the mobile station in step 317. The network element then performs a check of the validity of elements contained in the message, step 327. First, it calculates the result of the formula AMSI= h(IMSI; RND1, RND2) calculated by using elements of the message. It then examines whether the AMSI produced by the formula is the same as the one it received earlier from the mobile station in step 313. Finally, it checks if the second random number $RND_1$ given in the message is the same as the one it received in step 313. If all AMSIs are exactly identical and the second random numbers tally, the network element will be assured that the mobile station is exactly the same as the one at issue in the beginning of the process. If the received values do not tally fully in the check, the network element will interrupt the access protocol and will remove the traffic channel from use by this session, whereby it may be allocated to some other connection.

If all things are okay so far, the network element will also perform authentication of the mobile station. If the authentication gives a proper result, traffic may commence on the indicated traffic channel.

Figure 1:
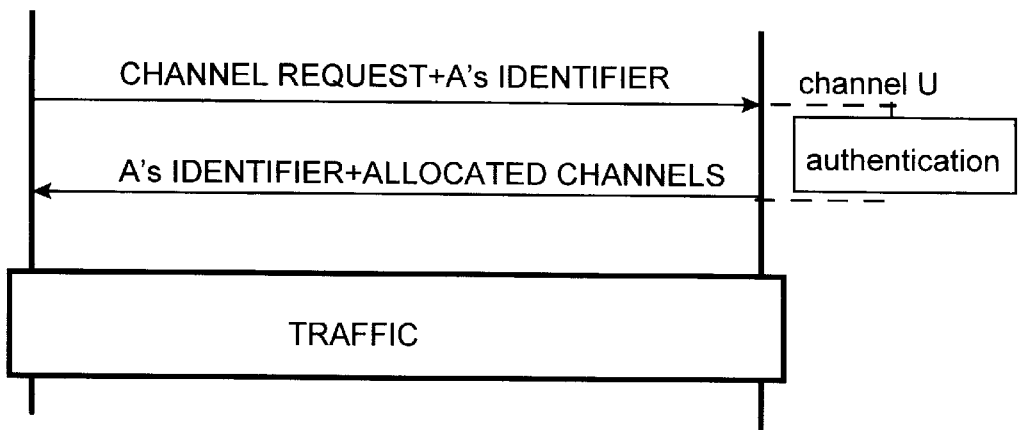
Figure 4:
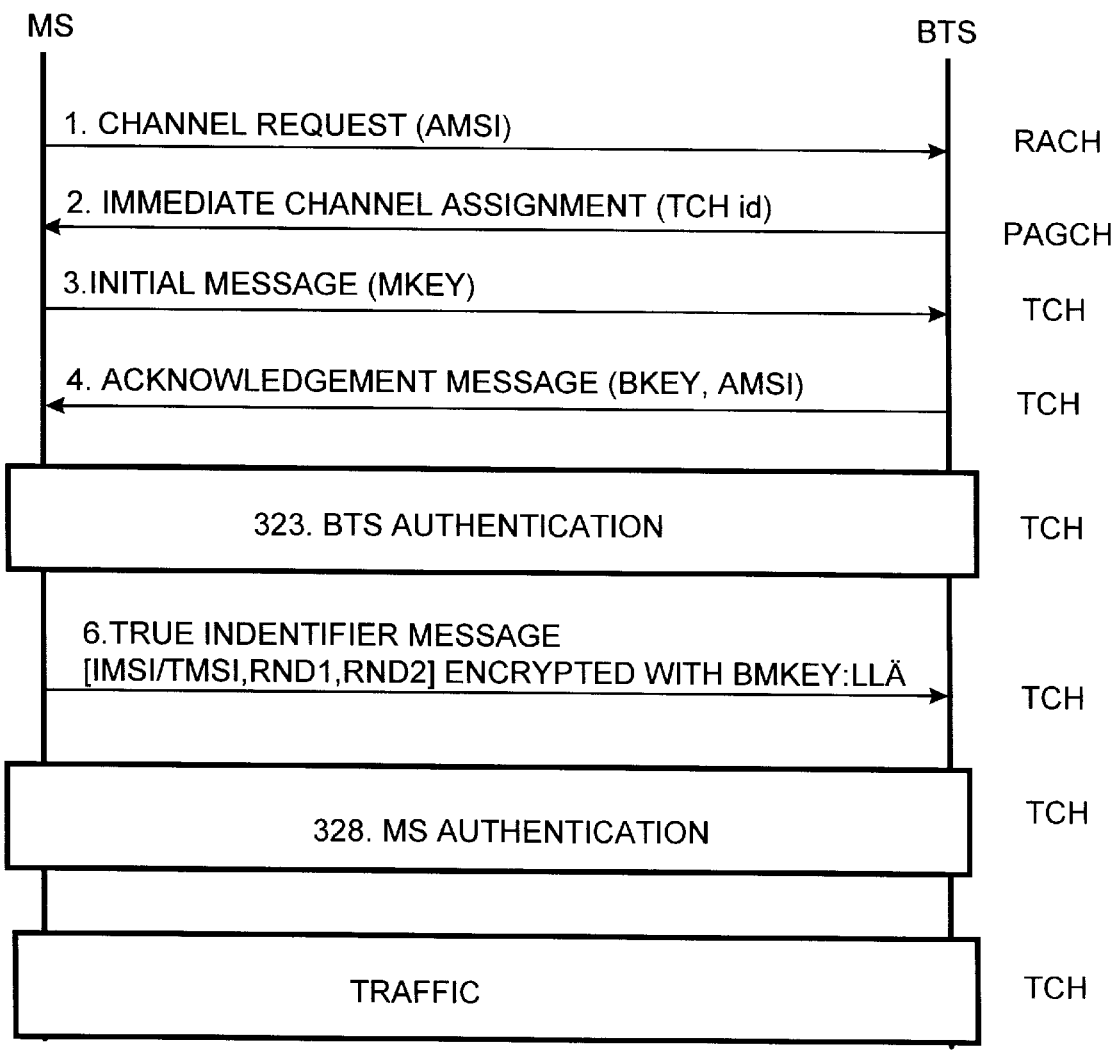
FIG. 4 illustrates exchange of messages.

The signal diagram in FIG. 4 shows messages which are exchanged on the radio path between mobile station MS and base station BTS in the procedure shown in FIG. 3. Excepting authentication messages, there is hardly any more exchange of messages in the proposed method than in a state-of-the-art GSM system. The main information exchanged in the messages is shown within parentheses in the figure. The channels are also marked, and as can be noticed a major part of the messages is signaled on the traffic channel.

The purpose of the authentication of the network element, e.g. the base station, in steps 323 in FIGS. 3 and 4 is to provide the terminal equipment, e.g. the mobile station, with a possibility to check that it shares the secret key MBKEY with an honest network element, in other words, that the network element has such an operator's certificate which the terminal equipment trusts. Authentication of the network element is limited by the circumstance that the terminal equipment must perform authentication based on that information only which the network element supplies. ISO standard X.509 presents a set of authentication protocols which are suitable for use in this method. A brief description will be given of a straightforward protocol based on certificate and digital signature, as an example of a possible protocol by which the mobile station may make sure the relation of the base station and the key MBKEY:

1. MS sends a randomly chosen string of binary figures $RDN_3$ to the base station.

2. The base station receives the $RDN_3$ and makes a message containing a certificate and the $RDN_3$. It signs the message with a digital signature and then encrypts the message by using the key MBKEY and sends the message to the mobile station.

3. The mobile station decodes the encrypted message, checks the signature, the signature to the certificate and makes sure that the string of random figures sent in the message is the same as the one which it has sent earlier to the base station. If the message passes all these checks, then the authentication has given a positive result.

The purpose of the authentication of terminal equipment, e.g. of a mobile station, by the network element in step 328 shown in FIGS. 3 and 4 is to give an honest network element a possibility to make sure that it shares a common secret key (MBKEY) with such a piece of terminal equipment, the identifier of which (IMSI/TMSI) is exactly the one which the terminal equipment has sent in its message revealing the true identifier in step 325 of FIG. 3. The authentication differs from the authentication performed by the terminal equipment (the mobile station) for the reason that the terminal equipment has already revealed its true identity. For this reason, the network element performs an inquiry to some suitable database of the network asking for information about the terminal equipment which has this very identifier (IMSI/TMSI). In a mobile network the database is by nature a home location register (HLR). If the register information relating to the identifier indicates that all is okay, then the authentication has given a positive result and traffic may commence.

When using a commitment protocol according to the invention, at least three security factors will be achieved:

Firstly, it is impossible for a third party to find out the identifier of the terminal equipment when performing the protocol. It can be seen from FIG. 4 that the identifier of the terminal equipment is sent in messages 1, 4 and 6. It results from the characteristics of the hash function described on page 7 that any trespasser can not possible calculate the true identifier from messages 1 and 4. The true identifier to be transmitted in step 6 is encrypted with a common key, which is known only to the parties, so any trespasser can not find out the identifier without breaking the encryption algorithm.

Secondly, any foreign base station trying to put itself in the position of the real base station may indeed capture messages 1–4, FIG. 4, but if the authentication of the base station performed by the terminal equipment proceeds as it should, it will realize that the base station is not genuine and will discontinue the protocol. As the terminal equipment has sent its pseudo identifier only, no deceitful base station will be able in any way to calculate the true identifier thanks to the characteristic of the one-way hash function.

Thirdly, an honest base station is able to conclude whether the terminal equipment for which the channel was allocated is that very terminal equipment which sent the channel request. Based on the characteristics of the one-way hash function presented on page 7 it is impossible for any other terminal equipment than the one which has sent the channel request to calculate such parameters that would lead to an acceptable final result after the reception of message 6 in the base station of FIG. 4. Under these circumstances, the terminal equipment may on good grounds conclude if the traffic channel is intended exactly for itself, having received the acknowledgement message, message 4 in the figure.

The network element notices the attempt of a foreign terminal equipment to "steal" a traffic channel from the original requester, step 6 in FIG. 4, because it has received the pseudo identifier AMSI from the requester in the beginning of the protocol and because it is impossible for any foreign terminal equipment to calculate the second random number and the true identifier from the pseudo identifier.

The proposed commitment protocol adds to the traffic on the transmission path to some extent, mainly for the reason that message lengths will grow compared e.g. to typical message lengths in a GSM system. The length of the pseudo identifier is 160 bits, if the MD5 algorithm is used as hash function. If the Diffie-Hellman key exchange algorithm is used in the key exchange, the amount of information to be transmitted will be at least 500–1000 bits.

The proposed commitment protocol may be applied within the scope of the claims to any telecommunications network where the terminal equipment using joint resources first requests a connection from the network for transmission of information and the network in response to the request indicates the required connection.

What is claimed is:

1. Method of authentication between communicating parties in a telecommunications network, wherein a network element and terminal equipment perform authentication of each other and wherein the network element in response to an access message of the terminal equipment allocates a traffic channel on which the traffic is carried out, the method comprising:

forming in the terminal equipment a pseudo identifier by applying a one-way hash function to content elements comprising a true identifier of the terminal equipment and two random numbers;

sending the pseudo identifier and one of the random numbers in the access message;

forming in the terminal equipment a first partial key;

sending the first partial key to the network element on the traffic channel;

forming in the network element a second partial key;

sending the second partial key and the pseudo identifier to the terminal equipment on the traffic channel;

performing in the terminal equipment authentication of the network element;

forming in the terminal equipment, after successful authentication, a new message containing the true identifier non-encrypted; and sending to the network element on the traffic channel the new message encrypted with both partial keys.

2. Method as defined in claim 1, wherein when the pseudo identifier received by the terminal equipment and the pseudo identifier which it formed earlier are identical, the terminal equipment will perform authentication of the network element.

3. Method as defined in claim 2, wherein after a successful authentication the terminal equipment will form a new message containing content elements of the hash function and will send the new message to the network element encrypted with the first and second partial keys.

4. Method as defined in claim 3, wherein the network element deciphers the encryption of the new message using the first and second partial keys and performs authentication of the content elements.

5. Method as defined in claim 4, wherein in the authentication the network element:

applies a hash function to the content elements and compares the result with that pseudo identifier which it has received earlier in the access message, it compares to find out whether the second random number stated in the message is identical to the one which it received earlier in the access message.

6. Method as defined in claim 5, wherein when comparisons show that the pseudo identifier and the second random number are true, the network element will perform authentication of the terminal equipment.

* * * * *